(12) United States Patent
Gopalan et al.

(10) Patent No.: US 6,514,604 B2
(45) Date of Patent: Feb. 4, 2003

(54) MIGRATION INHIBITING LAYER FOR A WEATHERSTRIP

(75) Inventors: Krishnamachari Gopalan, Knoxville, TN (US); Marion A Royse, Maryville, TN (US)

(73) Assignee: Schlegel Corporation, New York, NY (US)

( * ) Notice: Subject to any disclaimer, the term of this patent is extended or adjusted under 35 U.S.C. 154(b) by 0 days.

(21) Appl. No.: 09/776,142

(22) Filed: Feb. 2, 2001

(65) Prior Publication Data

US 2002/0144466 A1 Oct. 10, 2002

(51) Int. Cl.[7] ............................................. B32B 27/00
(52) U.S. Cl. ................... 428/319.3; 428/122; 428/212; 428/218; 428/319.7; 428/319.9
(58) Field of Search .................... 428/319.3, 319.7, 428/319.9, 212, 218, 122

(56) References Cited

U.S. PATENT DOCUMENTS

| | | |
|---|---|---|
| 1,677,360 A | 7/1928 | Merrill |
| 2,240,855 A | 5/1941 | Phillips |
| 2,731,060 A | 1/1956 | Rowe |
| 4,442,167 A | 4/1984 | Iwasa et al. |
| 4,478,897 A | 10/1984 | Akashi et al. |
| 4,501,842 A | 2/1985 | Chmiel et al. |
| 4,513,044 A * | 4/1985 | Shigeki et al. ............. 428/122 |
| 4,538,380 A | 9/1985 | Colliander |
| 4,603,164 A | 7/1986 | Chmeil et al. |
| 4,812,357 A * | 3/1989 | O'Rell et al. ............ 428/304.4 |
| 4,851,462 A | 7/1989 | Chmiel et al. |
| 4,882,386 A * | 11/1989 | Stella ....................... 525/133 |
| 5,013,379 A | 5/1991 | Brooks et al. |
| 5,143,788 A | 9/1992 | Johnson |
| 5,179,156 A | 1/1993 | Takao et al. |
| 5,221,707 A | 6/1993 | Chihara et al. |
| 5,232,531 A | 8/1993 | Dammann et al. |
| 5,304,409 A | 4/1994 | Nozaki |
| 5,306,548 A | 4/1994 | Zabrocki et al. |
| 5,334,458 A | 8/1994 | Powers et al. |
| 5,356,705 A | 10/1994 | Kelch et al. |
| 5,376,454 A | 12/1994 | Sugasawa et al. |
| 5,403,632 A | 4/1995 | Mesnel et al. |
| 5,411,785 A * | 5/1995 | Cook ........................ 428/122 |
| 5,449,544 A | 9/1995 | Ogawa et al. |
| 5,489,461 A | 2/1996 | Iwasa et al. |
| 5,543,200 A | 8/1996 | Hargis et al. |
| 5,545,448 A | 8/1996 | Ford et al. |
| 5,562,961 A | 10/1996 | Buchholz et al. |
| 5,591,513 A | 1/1997 | Mahling |
| 5,605,736 A | 2/1997 | Zohar et al. |
| 5,612,386 A | 3/1997 | Ertle et al. |
| 5,691,406 A * | 11/1997 | Lane et al. ................. 524/322 |
| 5,766,703 A | 6/1998 | Mori et al. |
| 5,807,639 A | 9/1998 | Frappier et al. |
| 5,964,969 A * | 10/1999 | Sandstrom et al. ......... 152/524 |

* cited by examiner

Primary Examiner—Terrel Morris
Assistant Examiner—Leanna Roche'
(74) Attorney, Agent, or Firm—Brian B. Shaw, Esq.; Stephen B. Salai, Esq.; Harter, Secrest & Emery LLP

(57) ABSTRACT

A weatherstrip having a migration inhibiting layer including a butyl based elastomer, wherein the butyl based elastomer can include a blend of a halogenated butyl and EPDM. The migration inhibiting layer can be located on at least one of a dense portion and an expanded portion of the weatherstrip and is selected to substantially preclude the passage of decomposition products, thereby reducing odor emanation from the strip and discoloration from staining materials. The migration inhibiting layer may also include coloring agents thereby providing a colored weatherstrip.

33 Claims, 3 Drawing Sheets

MIGRATION INHIBITING LAYER FOR A WEATHERSTRIP

FIELD OF THE INVENTION

The present invention relates to weatherstrips, and more particularly to a migration inhibiting barrier for a weatherstrip and in a specific configuration, a layer for substantially precluding the migration of decomposition products, including odors and staining materials often resulting from blowing and curing agents used in formation of the weatherstrip.

BACKGROUND OF THE INVENTION

In many weatherseal constructions it is often advantageous to incorporate a foam or sponge portion. The foam or sponge provides a number of advantages including accommodating relatively wide variances and tolerances. For sponge seals or seals having sponge components, desirable characteristics often include resistance to compression set, relatively low compression load deflection and light weight.

The weatherstrips having sponge components preferably have a good resistance to compression set. Compression set resistance refers to the ability of a material to resume its initial shape after being subjected to a compressive load. Failure to provide good compression set resistance may lead to poor sealing performance. The weatherseal should also be relatively soft and yielding. A low compression load deflection insures that a door or window can be closed without the need for excessive force and yet sufficiently compress the weatherstrip to form the necessary sealing interface. In addition, it is often desirable that the weatherstrip be as lightweight as possible, that is having a low density. Low-density thermoplastic and thermosetting foams have exhibited high compressibility, yet have sufficient compression set resistance to provide a good seal. To produce such low density foams, a substantial percentage of blowing agent is typically introduced into the elastomer to be foamed.

However, the formation process of such foamed material tends to retain a relatively large amount of decomposition products from the blowing agent in the formed product. The decomposition products from the blowing agent slowly leach (pass) from the foamed component of the seal. These decomposition products typically have an objectionable odor. The emanating odor is objectionable to both the installers of the weatherstrips and purchasers of products incorporating the strips. In addition, decomposition products from curing agents can stain or form staining materials. Migration of the staining materials through the seal can undesirably color the seal. As the time between manufacture of the weatherstrip and possession by the end consumer continually decreases, the downsteam assemblers and consumers experience increased amounts of decomposition product leaching.

Therefore, the need exists for a weatherstrip, having a foam or sponge portion, wherein decomposition products such as odors and staining materials from the formation process are substantially retained within the product. A need also exists for a foam weatherstrip that can be readily colored. A need exists for a migration inhibiting layer that can be disposed at a variety of locations in a weatherstrip. The need exists for a migration inhibiting layer that can substantially preclude the migration of decomposition products associated with formation of the weatherstrip.

SUMMARY OF THE INVENTION

The present invention provides a migration inhibiting layer that can be readily located as an interior layer or an exposed layer in a weatherstrip. The migration inhibiting layer can be disposed upon and bonded to an expanded elastomer such as a foam or sponge portion of a weatherstrip. In addition, the present migration inhibiting layer can be colored to provide an exposed or visible surface of a weatherstrip with an aesthetically pleasing color.

The migration inhibiting layer is constructed to reduce passage of decomposition products generated during formation of the weatherstrip. The decomposition products can be created from blowing or curing agents used in formation of the weatherstrip. The decomposition products can include objectionable odors, usually resulting from blowing agents, or staining materials, usually resulting from curing agents.

In a preferred configuration, the migration inhibiting layer is formed of a blend of a halogenated butyl and EPDM. One configuration of the migration inhibiting layer contemplates the use of chlorobutyl as the halogenated butyl. In a further configuration, the halogenated butyl-EPDM blend is sufficient to substantially preclude the diffusion of decomposition products from the cellular structure of the expanded elastomer. In a further configuration, the migration inhibiting layer, such as the halogenated butyl-EPDM blend can be colored to provide an aesthetically pleasing appearance to the weatherstrip such as on at least one of a dense or expanded elastomer portion of the weatherstrip.

DETAILED DESCRIPTION OF THE PREFERRED EMBODIMENT

Figure 1:
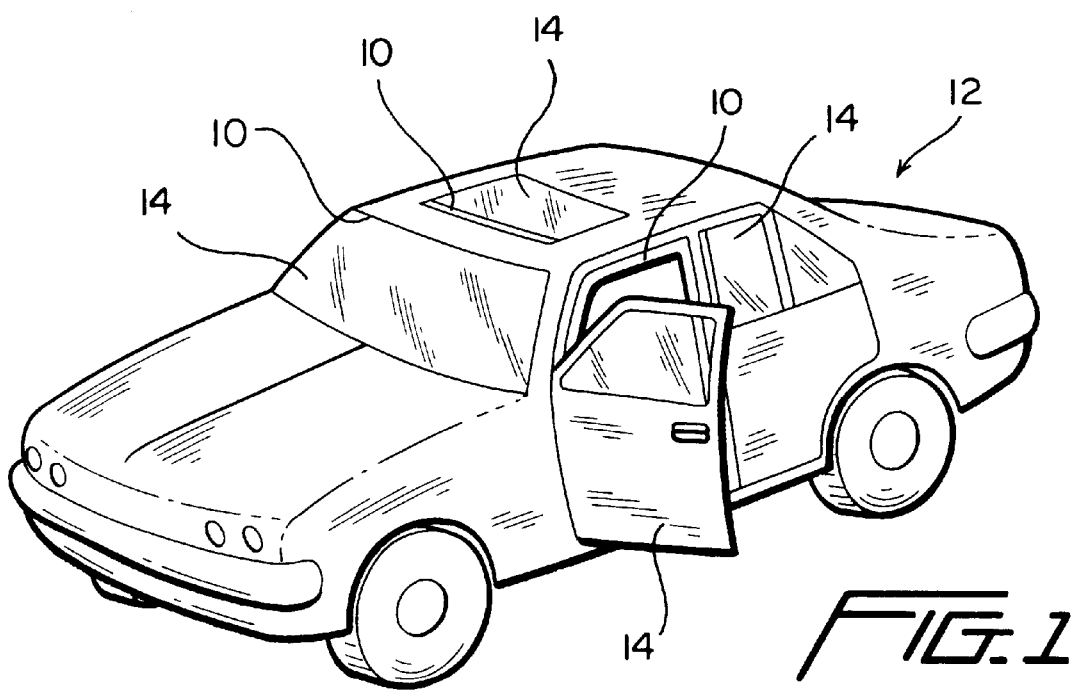
FIG. 1 is a perspective view of an automobile employing the present weatherstrips.
Figure 9:
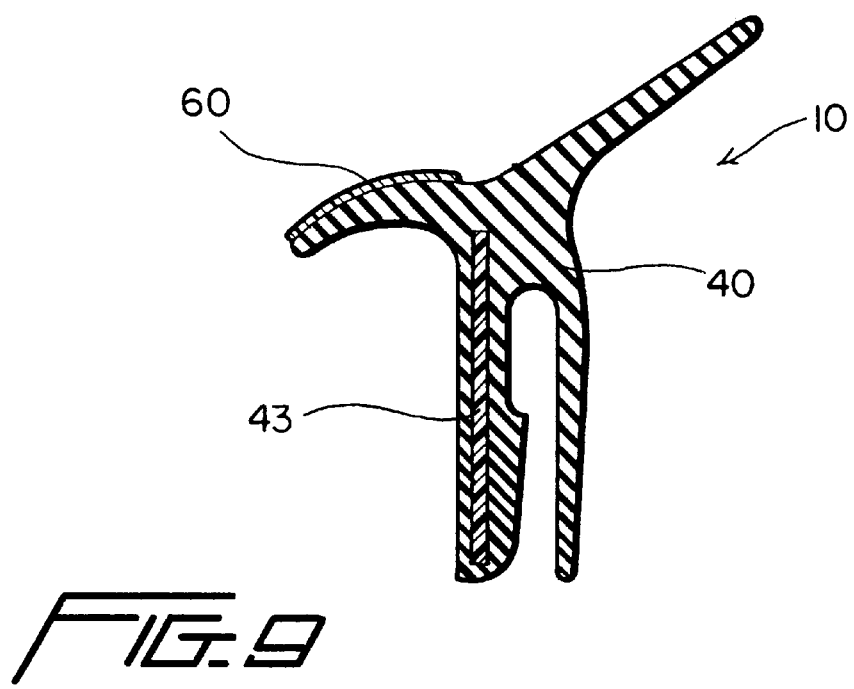
FIG. 9 is a cross sectional view of a further strip showing the migration inhibiting layer.
Figure 2:
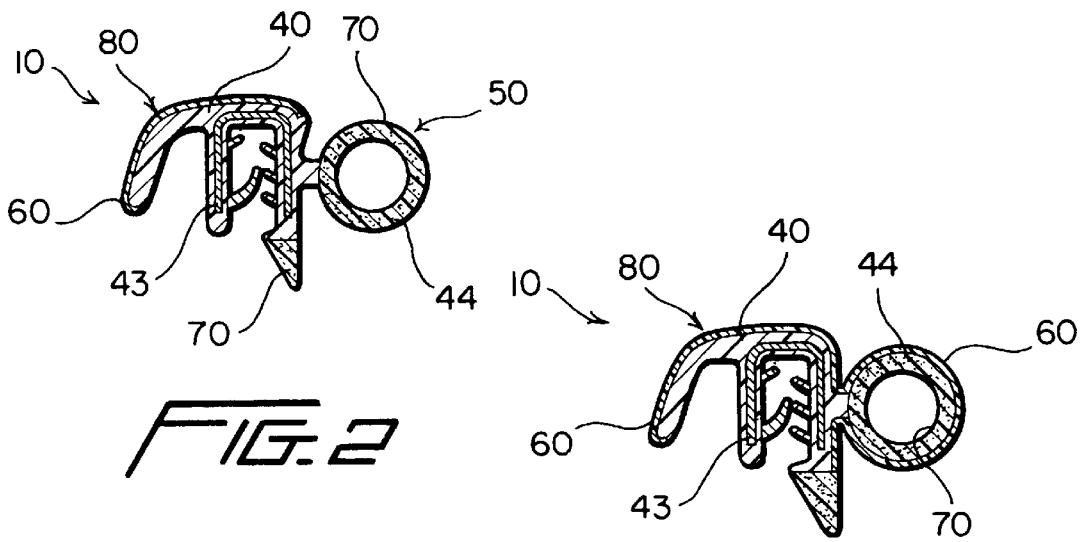
FIG. 2 is a cross sectional view of a first weatherstrip showing a first location of the migration inhibiting layer.
Figure 3:
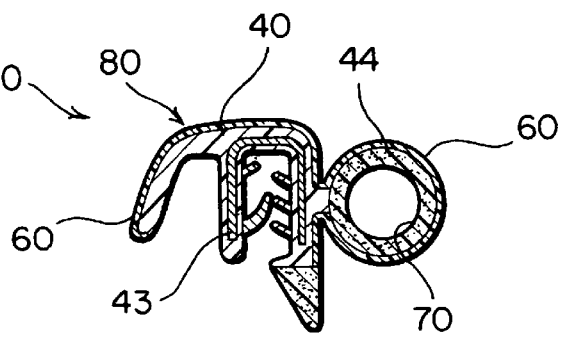
FIG. 3 is a cross sectional view of a first weatherstrip showing a second location of the migration inhibiting layer.
Figure 4:
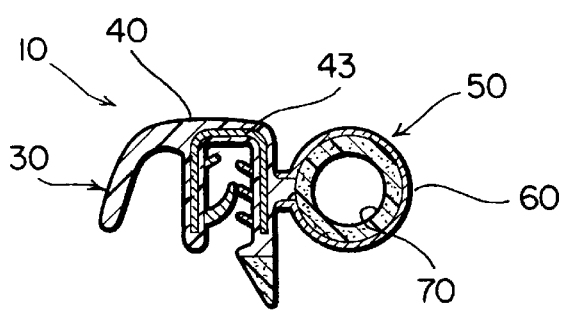
FIG. 4 is a cross sectional view of a first weatherstrip showing a third location of the migration inhibiting layer.
Figure 5:
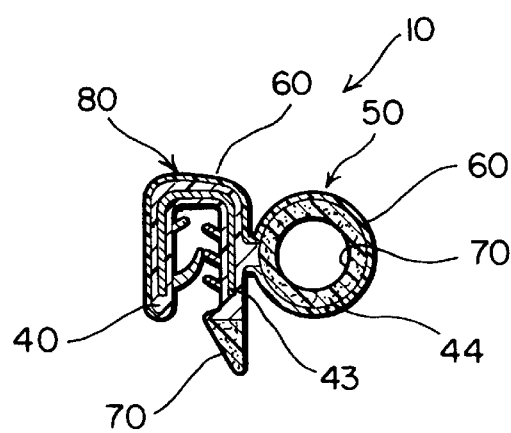
FIG. 5 is a cross sectional view of a second weatherstrip showing a first location of the migration inhibiting layer.
Figure 6:
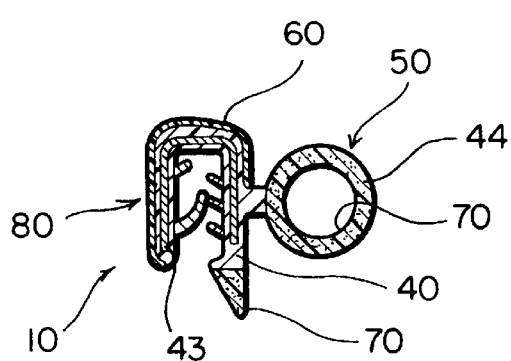
FIG. 6 is a cross sectional view of a second weatherstrip showing a second location of the migration inhibiting layer.
Figure 7:
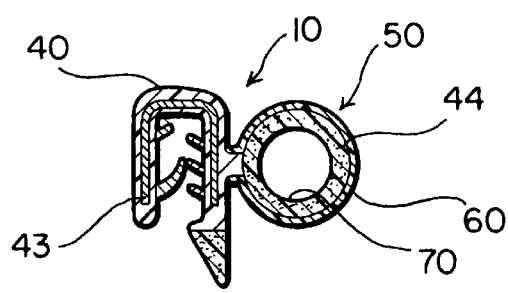
FIG. 7 is a cross sectional view of a second weatherstrip showing a third location of the migration inhibiting layer.
Figure 10:
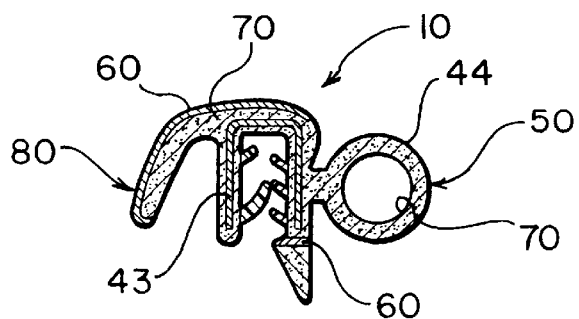
FIG. 10 is a cross sectional view of a strip having an interior and an exterior migration inhibiting layer.
Figure 11:
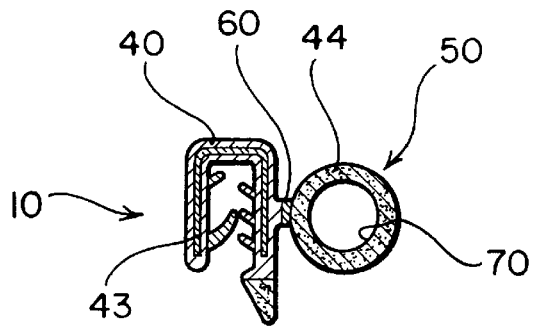
FIG. 11 is a cross sectional view of another strip having an interior migration inhibiting layer.
Figure 12:
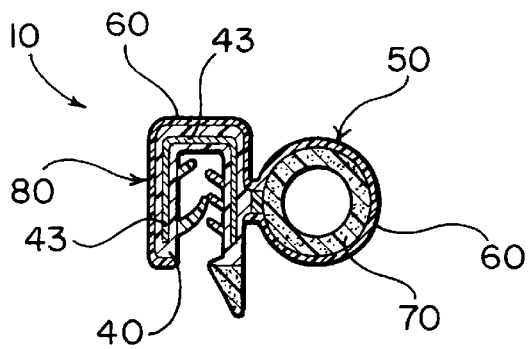
FIG. 12 is a cross sectional view of a further strip having an interior and an exterior migration inhibiting layer.
Figure 8:
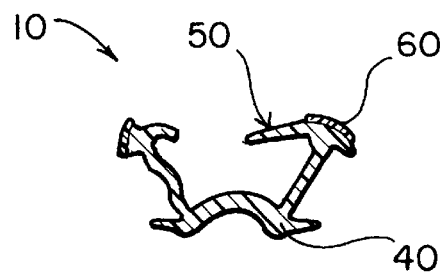
FIG. 8 is a cross sectional view of a third strip showing the migration inhibiting layer.
Figure 13:
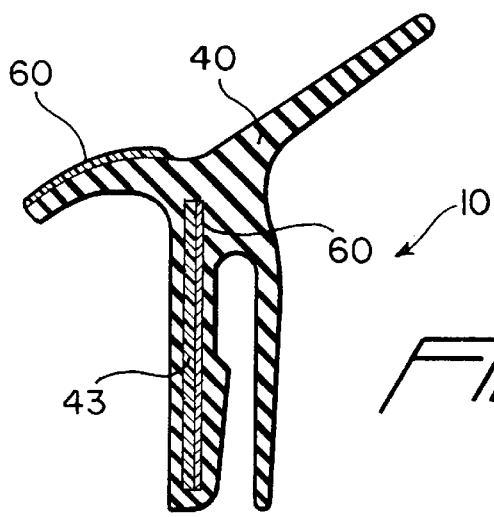
FIG. 13 is a cross sectional view of an alternative strip having an interior migration inhibiting layer.

The composite strip 10 of the present invention can be employed in a motor vehicle 12 as shown in FIG. 1. The composite strip 10 can be used in locations as a weatherstrip for releasably and repeatedly engaging a panel 14. For purposes of description, the present composite strip 10 will be described in terms of a weatherstrip employed in a motor vehicle; however, it is understood the present invention is not limited to this particular application which requires a resistance to environmental migration along an interface.

The term "composite strip" includes, but is not limited to extrusions, moldings, trim, trim pieces, edge pieces, weatherseals and seals. The present composite strip may be used as a weatherseal in structural sealing applications including residential and commercial buildings as well as the motor vehicle industry. In the motor vehicle industry, a weatherseal configuration of the present strip is suitable for use in many areas including, but not limited to, door seals, roof rails, deck lids, trunk lids, back window seals, belt line seals, fixed window seals, windshields, front hood seals, hood to cowl seals, window seals, sun roof seals or window channel seals. In particular, the present invention finds particular application in combined seal and edge trims, where the weatherstrip 10 includes an expanded elastomer. For purposes of clarity, the present description is set forth in terms of weatherstrips, however, this is not intended to limit the scope of the invention.

The panel 14 may be any of a variety of materials and does not limit the present invention. For example, the panel 14 may be glass, metal or a composite, which is painted, surface treated or bare. In the operating environment, the panel 14 is brought repeatedly into and out of engagement with the weatherstrip 10. The engagement of the panel 14 and the weatherstrip 10 may result from motion of the panel relative to the weatherstrip. Alternatively, the weatherstrip 10 may be moved relative to the panel 14. Further, the weatherstrip 10 and the panel 14 may be oriented to substantially preclude unintended movement. For example, the weatherstrip 10 may be located about a fixed panel 14 such as a front or a rear window.

Referring to FIGS. 2–13, the weatherstrip 10 of the present invention includes a substrate 40 and a migration inhibiting layer 60, wherein the weatherstrip can include one or both of a sealing portion 50 and a trim portion 80. In addition, various configurations of the weatherstrip 10 can include an expanded elastomer layer or component 70. That is, the weatherstrip 10 can include a relatively dense portion and a lower density portion.

Substrate

The substrate 40 forms a base upon which the migration inhibiting layer 60 and any expanded elastomer 70 are disposed, and may be formed of a variety of materials including thermoplastic or thermosetting materials, including but not limited to TPE, EPDM or any combination thereof. Suitable vulcanized or cross-linked (thermosetting) polymeric materials include the EPDM, EPDM blended with chlorobutyl, nitrile blended with EPDM, polyethylene, ethylene vinyl acetate or polypropylene.

The substrate 40 may have a relatively rigid portion and a relative soft portion. That is, the substrate can exhibit dual durometer characteristics. The substrate 40 can include a reinforcing member 43 such as a wire or metal carrier, which may be of known construction (e.g. knitted wire, slotted or stamped metal). It is contemplated, the substrate 40 may include a thermoplastic portion and a thermoset portion each having a unique rigidity, wherein the thermoplastic portion typically increases the rigidity of the weatherstrip 10. In addition, the substrate 40 may be formed of differing thickness to provide differing amounts of rigidity. The substrate 40 may have any of a variety of cross sections. For example, the cross-section profile may be generally "U" shaped, "J" shaped, "L" shaped or planar.

The substrate 40 can include a sealing portion 50 or contact surface that abut or contact the panel 14. The substrate 40 can also include an exterior, or trim portion 80 which does not contact the panel 14. The sealing portion 50 and the trim portion 80 can have different densities. Thus, the substrate 40 can include a relatively dense portion and a less dense portion.

Trim Portion

Typically, the exposed exterior surface 80 functions as trim. That is, the substrate 40 includes the decorative or trim portion 80 which does not provide a sealing function with the panel 14. The trim portion 80 may be used to hide or overlie a functional portion of the substrate 40. Therefore, it is often desirable for the trim portion 80 to have a different color than the underlying substrate 40 or portion of the substrate performing the sealing function.

The trim portion 80 can be constructed to enhance the appearance of the installed weatherstrip 10. The trim portion 80 can have any of a variety of configurations including but not limited to flaps, overlays and fingers. The decorative or trim portion 80 often has a different finish, texture or color than panel contacting portions of the weatherstrip.

Expanded Elastomer

The term "expanded elastomer" is intended to encompass cellular structures including both foam and sponge structures. That is, the expanded elastomer includes a cellular structure having a multitude of cells. The cells can be open cell or closed cell. Preferably, the cells are formed as closed cells.

The expanded elastomer 70 is often in the form of a bulb 44 for contacting and sealing against the panel 14. Alternative constructions of the sealing portion 50 include a flap, lip or finger seal. It is understood the expanded elastomer 70 can be located in or as a portion of the substrate 40, the sealing portion 50, or the trim 80. Typically, the expanded elastomer 70 has a lower density than the dense material of the substrate.

Although not required, the sealing portion 50 typically includes the expanded elastomer 70 as seen in FIGS. 2–7 and 10–12. As used in the sealing portion 50, the expanded elastomer 70 often allows the strip 10 to accommodate relatively large tolerances in the confronting surfaces as well as forming a sealed interface.

The expanded elastomer 70 can be any of a variety of materials including thermosetting materials and thermoplastic materials, wherein the thermoplastics include thermoplastic elastomers (TPEs).

In some configurations, the expanded elastomer 70 can include an olefinic material, as well as various fillers or additives while retaining a thermoplastic nature. Preferably, such expanded elastomer has a melting temperature which is less than the melting temperature or degradation temperature of the substrate 40. Thermoplastic elastomers are a unique class of thermoplastic engineering materials. They are based on several different polymer and polymer blend types that provide rubber-like (elastomer) properties in a material that can be processed on conventional thermoplastic processing equipment. These physical properties are provided in a material that is processable at elevated temperatures and can be reheated and reprocessed as any thermoplastic material.

The available range of materials includes polyethylene, polypropylene, or ethylene vinyl acetate. These can be modified with EPDM or butyl compounds and cross-linked by peroxides or moisture or other cross linking systems. The usual range of fillers and extenders like calcium carbonate, mica, talc and plastizisers can also be incorporated therein. The polyethylene, polypropylene or ethylene vinyl acetate can be modified with EPDM or butyl compounds and cross-linked by peroxides, moisture, radiation or other systems.

Expandable thermoplastic materials, which can also be used, are based upon olefinic TPEs. A preferred expandable thermoplastic elastomer is UNIPRENE® TPE sold by Teknor Apex of Pawtucket, Rhode Island. UNIPRENE® TPE is a specially designed thermoplastic vulcanizate which performs like cured rubber, but processes with the speed of thermoplastic olefins. Alternatively, the expandable thermoplastics material may be a blend of 90% Santoprene/10% polypropylene (or in any other ratio), or 100% Ethylene Vinyl Acetate (EVA), or a blend of the two.

Typical thermosetting materials used in the expanded elastomer 70 include EPDM, modified EPDM, and SBR. These materials are expandable with industry standard blowing agents.

Migration Inhibiting Layer

The migration inhibiting layer 60 is selected to substantially preclude passage, or diffusion of at least one decomposition product such as an odor or a staining material through the layer. The migration inhibiting layer 60 precludes the migration of the decomposition products from the weatherstrip 10 to the ambient environment. The decomposition products can result from blowing agents, or materials used in association with the formation of cells in the elastomer as well as materials used in formation of the seal such as curing agents. That is, the blowing agents and curing agents are typically transformed during formation of the weatherstrip 10 and produce decomposition products. Usually, decomposition products resulting from use of blowing agents generate objectionable odors. Decomposition products resulting from curing agents often produce staining materials. However, it is understood the decomposition products from blowing agents can be staining materials and the decomposition products from curing agents can be odors. In addition, the decomposition products are not limited to those resulting from curing agents or blowing agents. That is, decomposition products can include the materials or components employed in formation of the weatherstrips, such as residual curing or blowing agents. The term decomposition products is intended to encompass all those materials whose migration would objectionably or undesirably alter the weatherstrip 10.

The term "migration" is intended to encompass diffusion, passage, bleed, creep, seep or transmission of the decomposition products through the migration inhibiting layer 60.

During formation of the expanded elastomer 70, decomposition products may permeate the cellular structure. Further, for those cellular structures having a closed cell configuration, or even open cell configuration with relatively tortuous paths, the migration of the decomposition products from the cellular structure may occur over a period of minutes, hours, weeks or months.

The present migration inhibiting layer 60 is selected to act as a barrier and substantially preclude the migration of decomposition products from the weatherstrip 10, and particularly the expanded elastomer 70 to the ambient environment. Thus, after application of the migration inhibiting layer 60, the decomposition products do not substantially or significantly contribute to an odor of the weatherstrip 10. The migration inhibiting layer 60 substantially precludes migration of decomposition products, after curing or formation of the expanded elastomer 70, during installation of the weatherstrip 10 or during the useful life of the weatherstrip, which may be ten years or more.

In further configurations, the migration inhibiting layer 60 is selected to substantially preclude the migration of staining materials, which can be or result from a decomposition product, as well as components from a different portion of the weatherstrip across the layer. Typical staining materials which cannot pass through the migration inhibiting layer 60 include carbon black, ultramarine, titanium oxide, zinc oxide, red iron oxide, Prussian blue, azo pigment, nitron pigment, color lake, phthalocyanine pigment aromatic materials, paraffins and the like.

Depending upon the construction of the weatherstrip 10, the migration inhibiting layer 60 can be located at any of a variety of locations in the weatherstrip. An anticipated location of the migration inhibiting layer 60 is disposed on at least a portion of the expanded elastomer 70. However, it is understood the migration inhibiting layer 60 may also be disposed on the trim portions 80. That is, the migration inhibiting layer 60 can form an exposed surface of the weatherstrip 10. The migration inhibiting layer 60 can be located interior of the weatherstrip 10 intermediate a surface layer and the reinforcing member 43. The migration inhibiting layer 60 can therefore be located as an internal layer, an intermediate layer, or a surface or exposed layer relative to the overall structure of the weatherstrip 10. Further, the migration inhibiting layer 60 can be located on any portion of the weatherstrip 10 such as the substrate 40, the reinforcing member 43, the sealing portion 50 or the trim portion 80. It is anticipated the migration inhibiting layer 60 can be disposed over the expanded elastomer 70 as well as the trim portion 80, thereby providing a weatherstrip having uniform color. That is, the migration inhibiting layer 60 can be located on at least one or both of the dense portion and the sponge portion of the weatherstrip 10.

As the migration inhibiting layer 60 can be disposed on the surface of the expanded elastomer 70 or the trim portion 80, the migration inhibiting layer may include a variety of coloring agents and thereby provide any of a variety of desired aesthetic appearances and correspond to the operating environment of the weatherstrip 10. The coloring agents for the migration inhibiting layer 60 include but are not limited to zinc oxide, iron oxide and titanium dioxide. Thus, the migration inhibiting layer 60 can cover an underlying layer of a relatively dark color, while including and exhibiting a lighter color without the underlying color from bleeding through. Therefore, the migration inhibiting layer 60 can have a color that is different from an underlying layer.

The migration inhibiting layer 60 includes a butyl based elastomer. The butyl based elastomer can be cross-linked, a thermoplastic elastomer (TPE) or a blend.

In one configuration, the butyl based elastomer is a halogenated butyl based TPE. A further configuration of the butyl based elastomer includes a blend of halogenated butyl and at least one of a thermoset, thermoplastic or thermplastic elastomer. By selecting the composition of the butyl based elastomer, the migration inhibiting layer 60 can be disposed on a wide variety of substrates 40, including thermosets, thermoplastics, thermoplastic elastomer, as well as expanded phases of these materials.

A preferred material for the migration inhibiting layer 60 is a blend of EDPM and halogenated butyl. A more preferred material for the migration inhibiting layer 60 is a blend of EPDM and chlorobutyl. It is understood the halogenated butyl and EPDM blend can include a variety of additional materials typically employed in rubber processing such as stabilizers, plasticizers and lubricants.

Thus, the weatherstrip 10 includes a migration inhibiting layer 60 formed of a blend of halogenated butyl and rubber. Preferably, the blend is selected to substantially preclude migration of at least one of odor or coloring agents from an interior of the weatherstrip 10 to an exterior of the strip or provide an aesthetically pleasing color.

A migration inhibiting layer composition found effective is:

| Component | Preferred Range (phr) | Preferred values (phr) |
|---|---|---|
| Chlorobutyl 1066 | Approximately 80–40 | Approximately 60 |
| Keltran 4703 | Approximately 20–60 | Approximately 40 |
| Titamax (Titanium dioxide) | Approximately 20–30 | Approximately 25 |
| Nucap (clay) | Approximately 45–85 | Approximately 65 |
| Sunolite wax | Approximately 0–6 | Approximately 3 |
| Drakeol Supreme White oil | Approximately 10–30 | Approximately 20 |
| Color Masterbatch | Color dependent | Approximately 4 |
| SP 1077 | Approximately 3–8 | Approximately 5 |
| Zinc Oxide | Approximately 3–8 | Approximately 5 |
| Vultac 5 | Approximately 1–3 | Approximately 1.5 |
| MBT | Approximately 0.5–2 | Approximately 0.8 |
| TMTD | Approximately 0.3–0.8 | Approximately 0.6 |
| Sulfur | Approximately 0.5–1.5 | Approximately 1 | where phr is parts per hundred rubber.

In the preferred construction, the migration inhibiting layer 60 bonds to the adjacent surface or portion of the weatherstrip 10. That is, the migration inhibiting layer 60 sufficiently adheres to preclude unintended separation as well as non destructive separation. However, it is understood an adhesive, adhesive promoter or bonding agent can be located intermediate the migration inhibiting layer 60 and the adjacent portion of the weatherstrip 10.

Method of Manufacture

The migration inhibiting layer 60 can be formed in a variety of ways in response to the remaining components of the weatherstrip 10 and the intended operating environment of the strip. Although the preferred formation of the migration inhibiting layer 60 is an extrusion process, it is understood the layer can be sprayed, sputtered, poured or preformed and bonded to the substrate 40.

The substrate 40 and expanded elastomer 70 is formed according to conventional techniques. These techniques include introducing blowing agents into a curable rubber, then curing the rubber, wherein the cellular structure is formed during curing. Conventional techniques for expanded thermoplastic or TPE also include (i) feeding a resin into an extruder to melt the resin in the barrel of the extruder, (ii) continuously injecting into the molten resin a solvent blowing agent, usually in a liquid or gaseous state or a chemical blowing agent dispersed throughout the particulate resin in powder form before the resin is fed to the extruder, (iii) mixing and dissolving the blowing agent as uniformly as possible in the molten resin and (iv) forcing the mixture through a die, such that the material undergoes decompression to atmospheric pressure so that the blowing agent expands within the body of material as bubbles and a foam is produced.

In these processes, at least a portion of the decomposition products are retained within the cellular structure of the expanded elastomer 70. The cells of the foam thus initially trap a portion of the decomposition products. As the cellular structure has relatively thin walls, the trapped decomposition products can slowly migrate from the cellular structure to the ambient atmosphere.

Therefore, upon formation of the substrate 40 and any expanded elastomer 70, the migration inhibiting layer 60 is disposed on the desired locations. Downstream of the formation of the expanded elastomer 70, the migration inhibiting layer 60 can be extruded to cover the expanded elastomer. The substrate 40 and migration inhibiting layer 60 can then be passed through a curing station to cure the materials.

Depending upon the intended location of the migration inhibiting layer 60, the material of the layer includes the desired colorants prior to formation of the layer.

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

What is claimed is:

1. An improved weatherstrip for a vehicle, the weatherstrip having an expanded elastomer portion and a substrate directly affixed to the expanded elastomer, the improvement comprising a migration inhibiting layer on a portion of the expanded elastomer, the migration inhibiting layer including a blend of ethylene-propylene copolymer rubber and halogenated butyl.

2. The weatherstrip of claim 1, wherein the ethylene-propylene copolymer rubber is EPDM.

3. The weatherstrip of claim 1, wherein the halogenated butyl is chlorobutyl.

4. The weatherstrip of claim 1, wherein the expanded elastomer has a first color and the migration inhibiting layer has a second different color.

5. An improved weatherstrip for a vehicle, the weatherstrip having a panel contacting portion and a substrate directly affixed to the panel contacting portion, the improvement comprising a migration inhibiting layer attached to one of the panel contacting portion and the substrate, the migration inhibiting layer including a butyl based elastomer.

6. The weatherstrip of claim 5, wherein the butyl based elastomer includes a halogenated butyl.

7. The weatherstrip of claim 6, wherein the halogenated butyl is chlorobutyl.

8. The weatherstrip of claim 5, wherein the butyl based elastomer includes a butyl based thermoplastic elastomer.

9. The weatherstrip of claim 5, wherein the butyl based elastomer includes a blend of a halogenated butyl and one of a thermoplastic, a thermoset and a thermoplastic elastomer.

10. The weatherstrip of claim 5, wherein the butyl based elastomer includes a halogenated butyl based thermoplastic elastomer.

11. The weatherstrip of claim 5, wherein the butyl based elastomer includes a blend of halogenated butyl and ethylene-propylene rubber.

12. The weatherstrip of claim 11, wherein the ethylene-propylene rubber is EPDM.

13. The weatherstrip of claim 5, wherein the substrate includes at least one of a thermoplastic material and a thermosetting material connected to the migration inhibiting layer.

14. The weatherstrip of claim 13, wherein the substrate has a first color and the migration inhibiting layer has a second different color.

15. The weatherstrip of claim 5, further comprising an expanded elastomer connected to the migration inhibiting layer.

16. The weatherstrip of claim 15, wherein the expanded elastomer has a first color and the migration inhibiting layer has a second different color.

17. An improved weatherstrip for a vehicle, the weatherstrip including a substrate having at least one of a thermoplastic and a thermoset material, and a resilient portion directly affixed to the substrate, the resilient portion having a lesser density than the substrate, the improvement comprising a migration inhibiting layer disposed on a portion of one of the resilient portion and the substrate, the migration inhibiting layer including a butyl based elastomer.

18. The weatherstrip of claim 17, wherein the butyl based elastomer includes a bend of EPDM and halogenated butyl.

19. The weatherstrip of claim 17, wherein the resilient portion has a first color and the migration inhibiting layer has a second different color.

20. The weatherstrip of claim 17, wherein the resilient portion has a cellular structure.

21. An improved weatherstrip for a vehicle, the weatherstrip having an expanded elastomer adapted to repeatedly and releasably engage a panel of the vehicle, and a substrate connected to the expanded elastomer, the improvement comprising an odor migration inhibiting layer overlying the expanded elastomer and selected to substantially preclude migration of an odor from the expanded elastomer through the odor migration inhibiting layer.

22. The weatherstrip of claim 21, wherein the odor migration inhibiting layer includes a halogenated butyl.

23. The weatherstrip of claim 21, wherein the odor migration inhibiting layer forms a surface layer of the weatherstrip.

24. The weatherstrip of claim 21, further comprising a second odor migration inhibiting layer forming an internal layer of the weatherstrip.

25. The weatherstrip of claim 21, wherein the odor migration inhibiting layer includes a butyl based elastomer.

26. The weatherstrip of claim 21, wherein the odor migration inhibiting layer includes a blend of halogenated butyl and EPDM.

27. The weatherstrip of claim 21, wherein the odor migration inhibiting layer includes a blend of chlorobutyl and EPDM.

28. An improved weatherstrip for a vehicle, the weatherstrip having a polymeric substrate and an expanded elastomer portion, the improvement comprising a migration inhibiting layer overlaying the expanded elastomer portion, the migration inhibiting layer including a blend of ethylene-propylene copolymer rubber and halogenated butyl.

29. The improved weatherseal of claim 28 wherein the migration inhibiting layer is intermediate the polymeric substrate and the expanded elastomer portion.

30. The improved weatherseal of claim 29, wherein the expanded elastomer portion has a first color and the substrate has a different second color.

31. The improved weatherseal of claim 28, wherein the ethylene-propylene copolymer rubber is EPDM and the halogenated butyl is chlorobutyl.

32. The improved weatherseal of claim 28, wherein the migration inhibiting layer overlays the polymeric substrate.

33. The improved weatherseal of claim 28, further comprising a trim portion, and the migration inhibiting layer is disposed on the trim portion.

* * * * *

UNITED STATES PATENT AND TRADEMARK OFFICE
CERTIFICATE OF CORRECTION

PATENT NO.     : 6,514,604 B2                                    Page 1 of 1
DATED          : February 4, 2003
INVENTOR(S)    : Gopalan, Krishnamachari and Royse, Marion A.

It is certified that error appears in the above-identified patent and that said Letters Patent is hereby corrected as shown below:

<u>Column 9,</u>
Line 5, the word "bend" should read as -- blend --.

Signed and Sealed this

Twenty-fifth Day of March, 2003

JAMES E. ROGAN
*Director of the United States Patent and Trademark Office*